(No Model.)

3 Sheets—Sheet 1.

L. A. McCARTHY.
CONDUIT ELECTRIC RAILWAY.

No. 505,841.

Patented Oct. 3, 1893.

Witnesses
C. E. Ashley
H. W. Lloyd

Inventor
Laurence A. McCarthy (No Model.) 3 Sheets—Sheet 2.

L. A. McCARTHY.
CONDUIT ELECTRIC RAILWAY.

No. 505,841. Patented Oct. 3, 1893.

Witnesses
C. E. Ashley
H. W. Lloyd.

Inventor
Lawrence A. McCarthy

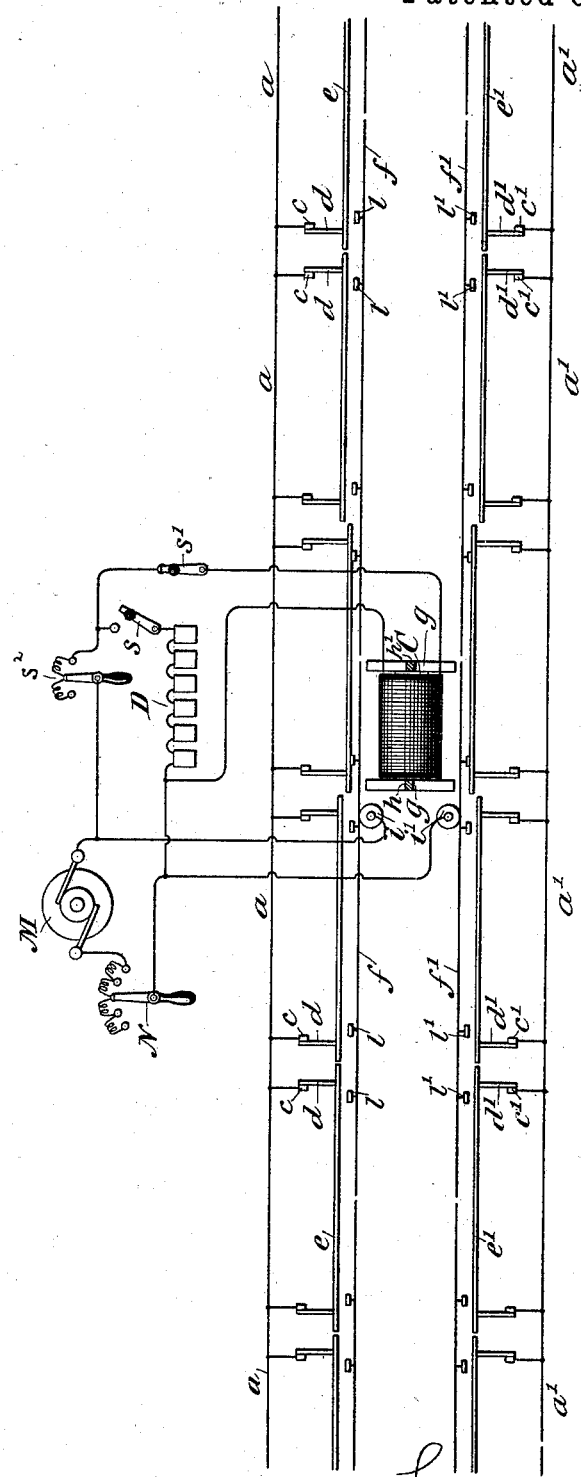くa

UNITED STATES PATENT OFFICE.

LAWRENCE A. McCARTHY, OF BROOKLYN, NEW YORK.

CONDUIT ELECTRIC RAILWAY.

SPECIFICATION forming part of Letters Patent No. 505,841, dated October 3, 1893.

Application filed February 6, 1893. Serial No. 461,122. (No model.)

*To all whom it may concern:*

Be it known that I, LAWRENCE A. McCARTHY, a citizen of the United States of America, and a resident of Brooklyn, Kings county, New York, have invented new and useful Improvements in Underground Conduits for Street-Car Propulsion, of which the following is a specification.

The object of my invention is to provide a practical underground or open conduit trolley system, for electrical street car propulsion, with as few objectionable features as possible, and by combining it with storage batteries carried on the cars secure the most desirable results obtainable from both systems.

I attain the object of my invention by first placing inside of an open conduit a non-magnetic waterproof tube or box. Inside of said tube or box is arranged an insulated, normally charged, electrical conductor. To said conductor are attached swinging metal arms. To the free ends of said arms are fastened pieces or bars of magnetic metal, capable of being attracted or controlled—by an electro-magnet passing within a short distance of same—and compelled to come in contact with and be pressed against insulated contact pieces that extend through but are insulated from the wall of said waterproof tube or box and are fastened to an insulated sectional conductor or trolley wire that is arranged on the outside of said tube or box and normally out of circuit with the supply conductors or power station. The before-mentioned swinging arms are to be controlled by an electro-magnet or magnets that are suspended from each car and arranged to be carried inside of said open conduit and near to the said waterproof tube or box, said controlling electro-magnet or magnets to be energized either by the current from the trolley circuit or by the current from a storage battery carried on the car, as desired. Said storage battery is also arranged to actuate the car motor for short distances, when desired, and then to be recharged from the trolley circuit at times when the current in the trolley circuit is not needed to propel the car and without the necessity of removing the battery from the car.

The accompanying drawings more fully illustrate the above described system and are made a part of this specification in which—

Figure 1:
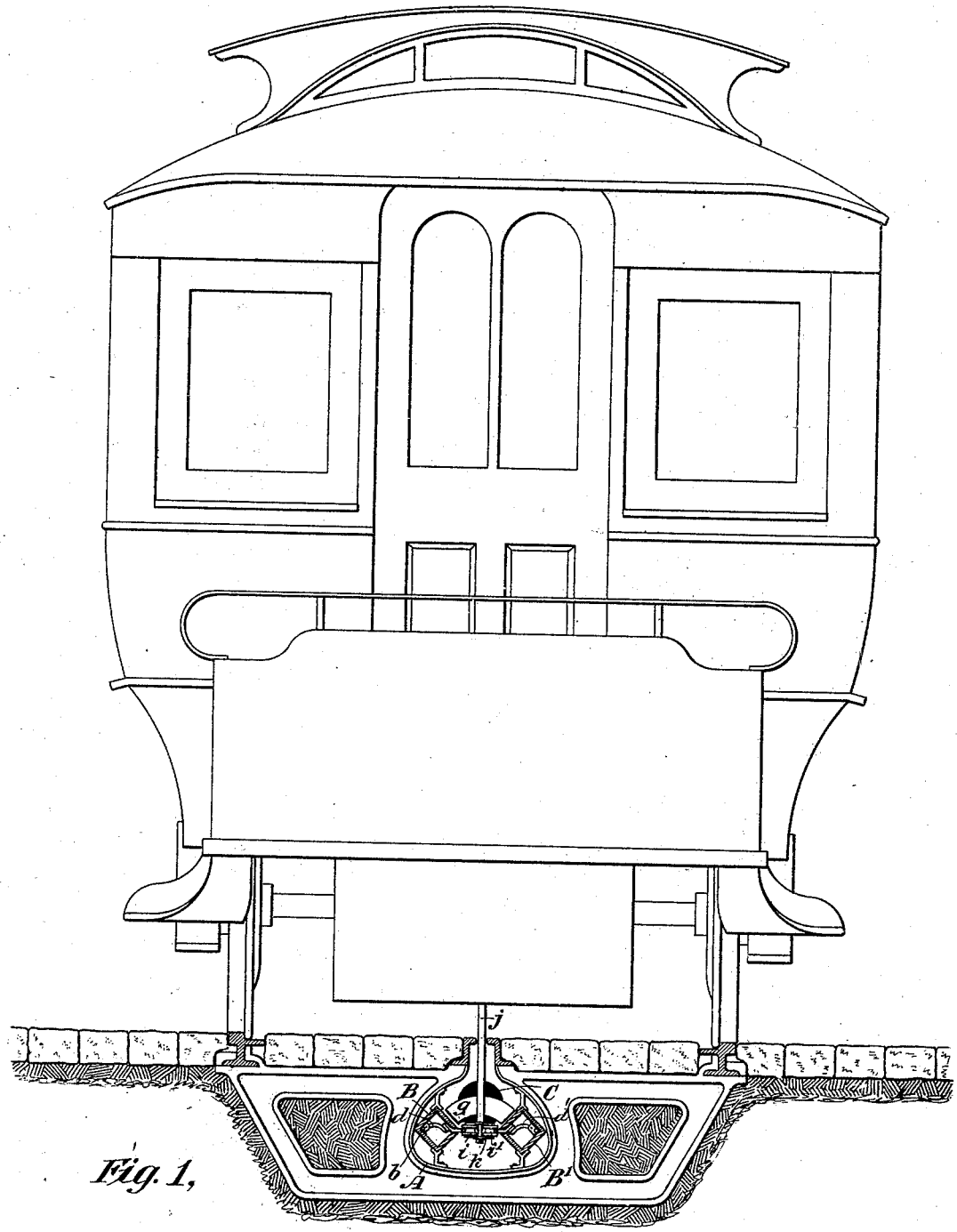
Figure 2:
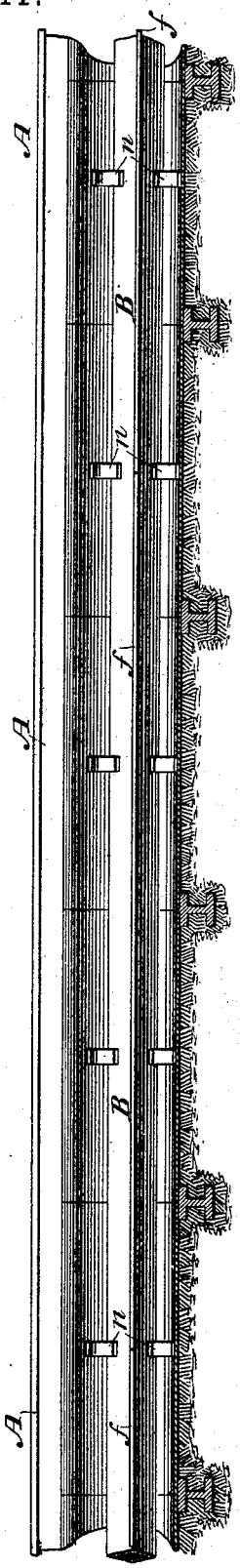
Figure 3:
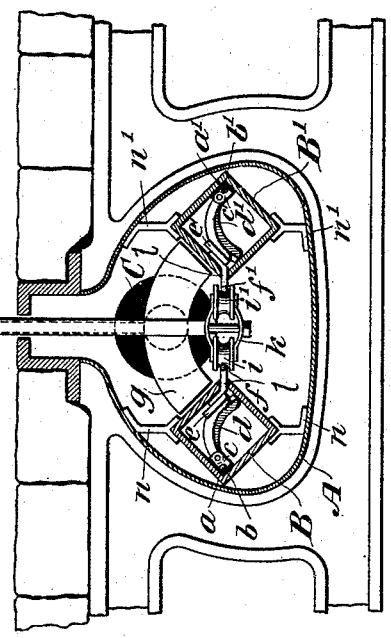

Figure 1, gives an end view of a car and a cross-sectional view of an open conduit, in which are shown the waterproof tubes or boxes, with their conductors, swinging arms, &c., also the trolley-wheels and electro-magnet suspended from the bottom of the car. Fig. 2, gives a longitudinal sectional view of the open conduit and a section of one of the waterproof tubes or boxes with its sectional trolley wire or conductor. Fig. 3, gives an enlarged cross-sectional view of the open conduit, more fully showing how the different parts are arranged in relation to each other. Fig. 4, is a diagram of the electrical connections showing how the different parts act on or are connected with each other.

Again referring to Fig. 3, A, represents the open conduit, B, and B', the waterproof tubes or boxes, fastened to the sides of the conduit by knee-pieces $n$, and $n'$. $a$ and $a'$, represent the normally charged conductors, insulated from the tubes or boxes B, B', by insulation $b$, and $b'$. Swinging arms $d$ and $d'$ are journaled at $c$ and $c'$, to conductors $a$, $a'$; pieces of soft iron or some other magnetic metal $e$, $e'$, are fastened to the free ends of arms $d$, $d'$. The combined weight of $d$, and $e$, or $d'$, and $e'$, holds them normally away from and out of contact with, contact pieces $l$, and $l'$, of sectional trolley wire $f$ and $f'$, as shown by the shaded sections in this figure and more fully shown in Fig. 4. C, represents the electro-magnet and $g$, its pole-pieces. When a current is passed through magnet C, it causes the pole pieces $g$, to attract the armatures $e$, $e'$, on arms $d$, $d'$, that stand opposite to or facing the magnet in the conduit, and causes said armatures to press against contact pieces $l$, $l'$, thereby making electrical connection between the normally charged wires $a$, $a'$, and the normally uncharged, trolley wires $f$, $f'$; each set of arms and armatures falling back to its normal position as soon as the current is shut off from magnet C, or the magnet is moved away from them. To suspension arm $j$ are attached the trolley wheels $i$, $i'$, by means of springs $k$, which can be arranged or adjusted in any suitable manner so as to the necessary pressure to make good contact between the trolley wheels $i$, $i'$, and the sectional trolley wires $f, f'$. Arm $h$, partly shown in broken section in this figure as standing directly behind arm $j$, is intended to suspend magnet C, from the bottom of the car.

In the diagram of connections shown in Fig. 4, $a$, $a'$, represent the normally charged wires, $f, f'$, the normally uncharged, sectional trolley wires, $d$, $d'$, the swinging arms to which are attached armatures $e$, $e'$. M represents the car-motor; N, the rheostat or controlling switch; D, the storage battery. The switches $s$, $s'$, and rheostat switch $s^2$ are for the purpose of making different combinations in, and controlling the strength of current passing through the shunt circuits, as follows: With switch $s$, open, $s'$ and $s^2$, closed the controlling magnet C, would be in a shunt circuit off of the motor circuit, between the trolley wire and the motor. With $s'$, open $s$ and $s^2$ closed the motor would be in circuit with and actuated by storage battery D; the circuit through magnet C, being broken it could not attract armatures $e, e'$, of swinging arms $d, d'$. Therefore there would be no circuit in trolley wires $f, f'$. With switch $s^2$, open, $s$, and $s'$ closed a current would flow from storage battery D, energizing magnet C, causing pole-pieces $g$, $g$, to attract the armatures opposite it thereby closing the circuit between conductors $a$, $a'$, and trolley wires $f, f'$, and sending a current through trolley wheels $i$, $i'$, and connecting wires to motor M. With all three switches $s$, $s'$, and $s^2$, closed battery D, would be in a divided circuit, one branch through magnet C, and the other a shunt on the motor trolley circuit and controlled by rheostat switch $s^2$, thereby charging the battery from the trolley circuit at the same time the battery is supplying magnet C with current.

It can readily be seen by referring to Fig. 4, that the only parts of the trolley wires that are in circuit, are those sections immediately underneath the car, and not even these unless a current is sent through the controlling magnet C, thereby in a large measure eliminating the dangers of leakage and escapes caused by moisture in the subway or conduit. While I show a double or return circuit it is well understood that the rails can be and are generally used for the return circuit.

Now, having described my invention and its mode of operation, while not limiting myself to the exact form shown, what I claim as my invention, and desire to secure by Letters Patent, is—

1. In an underground trolley system the combination of an electro-magnet suspended from a car and inside an open conduit; with said open conduit and with waterproof tubes or boxes arranged inside said open conduit, normally charged electrical conductors, arranged on the inside of said tubes or boxes, sectional normally uncharged conductors arranged partly inside and partly outside said tubes or boxes and connecting arms, arranged to be controlled by said electro-magnet, and to connect the normally charged with the normally uncharged conductor all substantially as set forth.

2. In an open conduit trolley system an electro-magnet arranged to be suspended from a car and inside the open conduit in combination with said open conduit waterproof tubes or boxes, insulated normally charged electrical conductors, sectional, normally uncharged electrical conductors, and swinging arms, arranged to be controlled by said electro-magnet and to connect the normally charged with the normally uncharged conductors, and trolley wheels, all inside said open conduit substantially as set forth.

3. In an open conduit trolley system the combination with an open or slotted conduit, of an electro-magnet suspended from a car, sectional normally uncharged electrical conductors, arranged partly inside and partly outside of watertight tubes or boxes, normally charged electrical conductors inside said tubes or boxes and connecting arms, arranged to be controlled by said electro-magnet, and to connect the normally charged with the normally uncharged conductors; all arranged inside said open conduit and below the surface of the street, and trolley wheels arranged to be suspended from the car and to press against the normally uncharged conductors.

4. In an underground trolley system the combination of waterproof tubes or boxes, arranged inside an open conduit, normally charged conductors inside said tubes or boxes, sectional normally uncharged conductors arranged partly inside and partly outside said tubes or boxes, electrically controlled swinging arms, arranged to connect the normally charged with the normally uncharged conductors and an electro-magnet suspended from a car and inside the open conduit; with trolley wheels, rheostat and motor, all so arranged that the current can pass from the charged conductors to the motor or to the electro-magnet, whenever the electro-magnet is caused to act on the swinging arms, substantially as set forth.

5. In an open conduit trolley system the combination of an electro-magnet arranged to be suspended from a car and inside of the open conduit, normally charged and normally uncharged electrical conductors, and connecting arms, also inside said open conduit, and arranged to be controlled by said electro-magnet, and an electric motor, with a storage battery and controlling switches on the car, arranged to throw the battery in or out of circuit with either the controlling magnet or the car motor and conductors or with both, substantially as set forth.

6. In an open conduit trolley system the combination of an electro-magnet suspended from a car and inside the open conduit, a storage battery and controlling switches on the car, said storage battery arranged to be connected either with the suspended magnet, or with the motor and conductors; with the motor and rheostat on the car, the trolley wheels suspended from the car and arranged to be pressed against the uncharged conductors, the charged and uncharged conductors, and the connecting arms, arranged to be controlled by the electro-magnet, all inside the slotted conduit and so arranged that the current will pass from the charged conductors to the motor, to the storage battery, or to the suspended magnet, when the connecting arms are acted on by the electro-magnet all substantially as set forth.

7. In an open conduit trolley system the combination of storage battery D, switches $s$, and $s^2$, with motor M, and switch N, on the car and current collectors $i\ i'$, conductors $f$, and $a$, electrically controlled contact arms $e$, and controlling magnet C, inside the open conduit all substantially as and for the purpose set forth.

8. In an open conduit trolley system the combination of normally charged and normally uncharged electrical conductors and swinging arms, arranged inside the open conduit, and an electro-magnet suspended from a car and also inside the open conduit, said arms arranged to be controlled by said electro-magnet; with contact wheels or brushes, an electric motor, and a storage battery and controlling switches, all so arranged that the current will pass from the charged conductors to the motors, to the battery, or to the electro-magnet, when the swinging arms are acted on by the electro-magnet, substantially as set forth.

In testimony that I claim the foregoing as my invention I have signed my name, in presence of two witnesses, this 2d day of February, 1893.

LAWRENCE A. McCARTHY.

Witnesses:
WM. E. ATHEARN,
N. B. TOPPING.